United States Patent
Sakurai

(10) Patent No.: US 10,691,903 B2
(45) Date of Patent: Jun. 23, 2020

(54) READING DEVICE AND METHOD OF READING INFORMATION FROM RFID TAG ATTACHED TO COMMODITY BY THE SAME

(71) Applicant: TOSHIBA TEC KABUSHIKI KAISHA, Shinagawa-ku, Tokyo (JP)

(72) Inventor: Wataru Sakurai, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/182,408

(22) Filed: Nov. 6, 2018

(65) Prior Publication Data

US 2020/0143121 A1 May 7, 2020

(51) Int. Cl.
*G06K 7/08* (2006.01)
*G06K 7/10* (2006.01)
*G06T 7/00* (2017.01)
*G06F 3/0484* (2013.01)

(52) U.S. Cl.
CPC ...... *G06K 7/10316* (2013.01); *G06F 3/04842* (2013.01); *G06T 7/0004* (2013.01); *G06T 2207/30242* (2013.01)

(58) Field of Classification Search
CPC ........ G06K 7/00; G06K 7/08; G06K 17/0022; G06K 17/0025

USPC ...... 235/451, 383, 462.46, 472.02
See application file for complete search history.

(56) References Cited

U.S. PATENT DOCUMENTS

| 6,169,483 | B1* | 1/2001 | Ghaffari ............... G06Q 10/087 340/572.3 |
| 2007/0008136 | A1 | 1/2007 | Suzuki |
| 2013/0278389 | A1* | 10/2013 | Cristache ........... G06K 7/10366 340/10.1 |
| 2014/0375431 | A1* | 12/2014 | Cristache ............. G01S 13/876 340/10.1 |
| 2017/0330426 | A1* | 11/2017 | Jaffri ...................... G07G 1/009 |

\* cited by examiner

*Primary Examiner* — Daniel St Cyr
(74) *Attorney, Agent, or Firm* — Foley & Lardner LLP

(57) ABSTRACT

According to one embodiment, a reading device reads inherent information of a commodity from an attached RFID tag. The device includes antennas arranged at different vertical locations with respect to a table having a placing region. The antennas respectively transmit radio waves from different locations to the placing region. A specifying unit of the reading device can specify a commodity in the placing region based on the inherent information read through the antennas. A selection unit of the reading device can select one commodity to be moved from the placing region from commodities specified by the specifying unit if a container in which the commodities are contained is taken in the placing region. A guide unit of the reading device can display guide information for instructing a movement of the commodity selected by the selection unit from the placing region on a display.

20 Claims, 11 Drawing Sheets

| COMMODITY | ANTENNA | READABILITY |
|---|---|---|
| C11 | ANT1 | × |
|  | ANT2 | ○ |
| C12 | ANT1 | ○ |
|  | ANT2 | × |
| C13 | ANT1 | ○ |
|  | ANT2 | ○ |
| C14 | ANT1 | ○ |
|  | ANT2 | × |

| COMMODITY | ANTENNA | READABILITY | RSSI |
|---|---|---|---|
| C21 | ANT1 | ○ | 2 |
| | ANT2 | ○ | 10 |
| C22 | ANT1 | ○ | 8 |
| | ANT2 | × | - |
| C23 | ANT1 | ○ | 2 |
| | ANT2 | ○ | 5 |
| C24 | ANT1 | ○ | 5 |
| | ANT2 | × | - |

READING DEVICE AND METHOD OF READING INFORMATION FROM RFID TAG ATTACHED TO COMMODITY BY THE SAME

FIELD

Embodiments described herein relate to a reading device and a method of reading information from an RFID tag attached to a commodity.

BACKGROUND

In the related art, a commodity sales data processing apparatus often performs a sales registration and settlement processing of a commodity by reading commodity information relating to the commodity from an RFID (Radio Frequency IDentifier) tag attached to the commodity. For example, a device may read commodity information from the RFID tag of a commodity when the commodity (alone or contained in a shopping basket) is placed on an upper surface of a checkout counter with an embedded flat antenna.

Recently, an increasing number of stores employ a self-checkout apparatus (i.e., self-checkout point of sales (POS) apparatus) to perform the sales registration and settlement processing of a commodity by a customer.

When performing the sales registration of a commodity with the RFID tag described above, an operator (customer) performing a reading operation places the commodity or the shopping basket within a pre-set transmission range of radio waves. However, some commodities may not be readable depending on an overlapping state of the commodities (RFID tags), an arrangement state, or the like if the shopping basket containing commodities is placed in the transmission range of radio waves. In such a case, the operator looks for a commodity of which reading is not yet completed in the shopping basket. However, since the commodity is mixed with commodities of which reading is completed, work of looking for the commodity is troublesome and there is room for improvement in terms of operability thereof.

DETAILED DESCRIPTION

According to one embodiment, a reading device can read inherent information of a commodity from an attached RFID tag. The device includes antennas arranged at different vertical locations with respect to a table. The table has a placing region for placing the commodity. The antennas respectively transmit radio waves from the different locations to the placing region. A specifying unit of the device can specify the commodity in the placing region based on the inherent information read through the antennas. A selection unit of the device can select one commodity to be moved from the placing region from commodities specified by the specifying unit if a container in which the commodities are contained is taken in the placing region. A guide unit of the device can display guide information for instructing a movement of the commodity selected by the selection unit from the placing region on a display.

Hereinafter, the reading device according to the embodiment is described with reference to the accompanying drawings. In the embodiment, a commodity sales data processing apparatus of a self-checkout system in which a customer performs a registration and settlement of a commodity is described.

Figure 1:
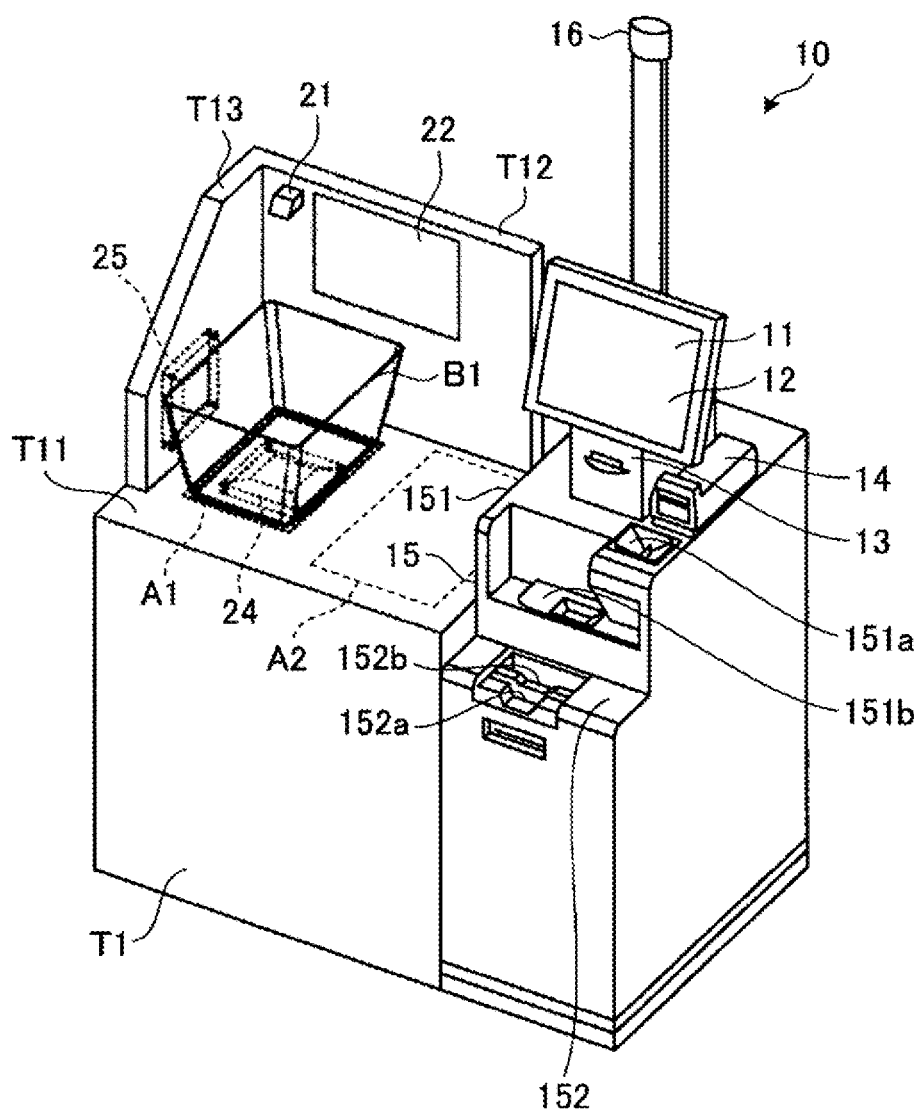
FIG. 1 is a perspective view illustrating an appearance of a commodity sales data processing apparatus according to an embodiment.

FIG. 1 is a perspective view illustrating an appearance of a commodity sales data processing apparatus 10 according to the embodiment and illustrates a state as viewed from an operator who operates the commodity sales data processing apparatus 10. The commodity sales data processing apparatus 10 is, for example, a self-checkout apparatus, a POS terminal, or the like, and functions as the reading device of the embodiment.

As illustrated in FIG. 1, the commodity sales data processing apparatus 10 includes a first display 11, an operation unit 12, a printer 13, a card reader 14, a settlement unit 15, and a warning lamp 16.

The first display 11 is, for example, an LCD (Liquid Crystal Display). The first display 11 displays various screens relating to a sales registration and settlement of the commodity under the control of a control unit 31 described later. In FIG. 1, a case in which the first display 11 is provided above the settlement unit 15 (above the printer 13 in the figure) is shown, but an installation position of the first display 11 is not limited thereto.

The operation unit 12 with a touch panel is provided on a display surface of the first display 11. The operation unit 12 receives an operation input by the operator and outputs the input operation contents to the control unit 31. The operation unit 12 is not limited to the touch panel but may be a hardware keyboard or the like.

The printer 13 is, for example, a well-known thermal printer. The printer 13 prints contents of a sales-transaction on a paper in a predetermined format to issue a receipt indicating the contents of one transaction under the control of the control unit 31.

The card reader 14 reads information from a card type recording medium and outputs the read information to the control unit 31. For example, the card reader 14 reads a user identifier for identifying a customer from a membership card possessed by the customer. The card reader 14 also reads information stored in a credit card used for the settlement.

The settlement unit 15 performs the sales registration of the commodity purchased by the customer based on information read by a reader/writer unit 23 described below. The settlement unit 15 performs a settlement processing of a commodity on which the sales registration is performed by a money transfer (giving and receiving of cash) or an information transfer (giving and receiving of data) instead of the money transfer.

The settlement unit 15 includes a coin change machine 151 and a bill change machine 152. The coin change machine 151 determines whether a coin inserted through a coin insertion slot 151a is genuine, and accepts the coin if it is authentic. When needed, the coin change machine 151 can dispenses a coin from a coin discharge slot 151b as the change. The coin insertion slot 151a is a depositing slot for receiving the inserted coin. The coin discharge slot 151b is a dispensing slot for discharging the coin.

The bill change machine 152 determines whether a bill inserted through a bill insertion slot 152a is genuine and accepts the bill if it is authentic. When needed, the bill change machine 152 can dispense a bill from a bill discharge slot 152b as the change. The bill insertion slot 152a is a depositing slot for receiving the inserted bill. The bill discharge slot 152b is a dispensing slot for discharging the bill.

The coin change machine 151 and the bill change machine 152 can notify the control unit 31 of an amount of accepted money. The coin change machine 151 and the bill change machine 152 receive notifications of amounts of money to be dispensed as the change from the control unit 31.

If there is a situation in which an operation by a store clerk is required, the warning lamp 16 informs person, i.e., store clerk, at surroundings of an occurrence of the situation by blinking light under the control of the control unit 31.

A work table T1 is installed at a side of the commodity sales data processing apparatus 10 (left side of the commodity sales data processing apparatus 10 in the figure). A commodity purchased by the customer is placed on the upper surface of the worktable T1 (hereinafter referred to as a placing surface T11).

A first placing region A1 and a second placing region A2 are formed on the placing surface T11. The first placing region A1 is a predetermined area for placing a commodity to be read (sales registration) or a shopping basket B1 containing the commodity. An RFID tag (not illustrated) storing information inherent to the commodity is attached to the commodity. At least the first placing region A1 of the placing surface T11 is made of a material through which radio waves pass, such as plastic, glass, or wood.

The second placing region A2 is also a predetermined area for placing a commodity on which the reading (sales registration) is completed. In the second placing region A2, a shopping bag for containing the commodity on which the sales registration is completed may be prepared in a state of being hung on a holder. A continuous surface is preferably formed between the first placing region A1 and the second placing region A2 to smooth movement of the commodity from the first placing region A1 to the second placing region A2. In FIG. 1, the second placing region A2 is provided between the first placing region A1 and the commodity sales data processing apparatus 10, but a relationship in arrangement between the first placing region A1 and the second placing region A2 is not limited thereto.

A first wall T12 and a second wall T13 are erected around the work table T1 (first placing region A1). Specifically, the first wall T12 is provided at the backside of the first placing region A1, and the second wall T13 is provided at the side (left-hand side in FIG. 1) of the first placing region A1. The first wall T12 and the second wall T13 are erected in an L shape to surround the work table T1 on which the first placing region A1 is provided.

The commodity sales data processing apparatus 10 is connected to an image capturing unit 21 provided on the first wall T12 through a connecting line (not illustrated). The image capturing unit 21 has an imaging element such as a CCD (Charge Coupled Device) or a CMOS (Complementary Metal Oxide Semiconductor) and is provided at a position where the first placing region A1 can be entirely imaged from the upper side.

The commodity sales data processing apparatus 10 is also connected to a second display 22 through a connecting line (not illustrated). The second display 22 is the same display device as the first display 11 and is installed, for example, on a wall surface of the first wall T12. The second display 22 is arranged at a position visible by the operator in a state in which the shopping basket B1 is placed in the first placing region A1.

The commodity sales data processing apparatus 10 is connected to the reader/writer 23 (refer to FIG. 2) through a connecting line (not illustrated). The reader/writer 23 is provided, for example, inside the work table T1 and is connected to a first antenna 24 and a second antenna 25.

The first antenna 24 and the second antenna 25 are, for example, planar antennas and transmit radio waves to communicate with an RFID tag (not illustrated) under the control of the reader/writer 23. The first antenna 24 is embedded in the work table T1 within the first placing region A1 or is provided on a surface of the work table T1 within the first placing region A1 to transmit radio waves from the first placing region A1 (work table T1) toward the upper side of the first placing region A1. The second antenna 25 is provided on a surface of the second wall T13 to transmit radio waves from the surface of the second wall T13 in a lateral direction of the first placing region A1 (work table T1), i.e., perpendicular to the transmission direction of the first antenna 24 to the first placing region A1. That is, the first antenna 24 and the second antenna 25 are arranged to transmit radio waves from different dimensions with respect to the first placing region A1 (work table T1).

Figure 2:
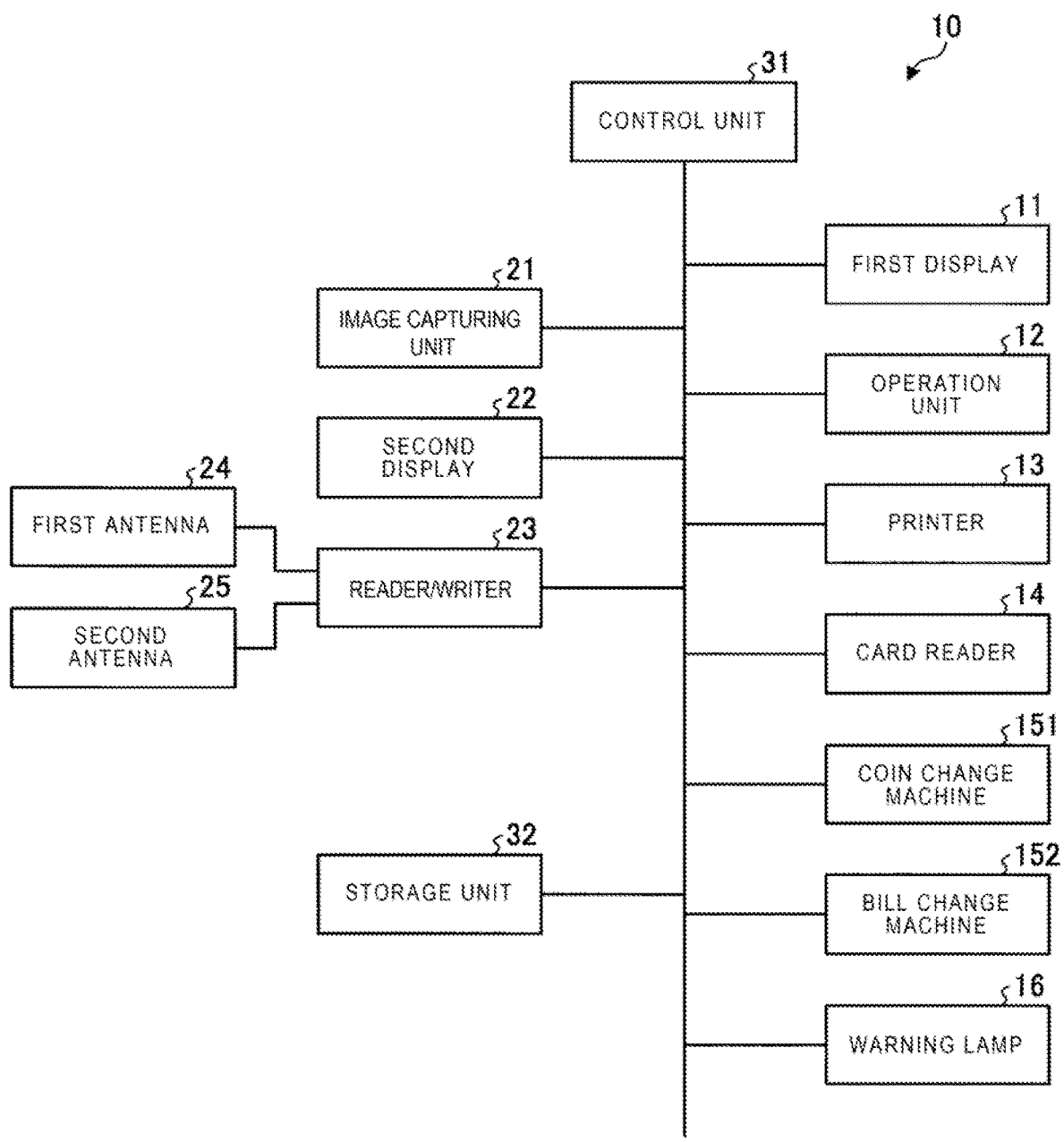
FIG. 2 is a diagram illustrating a hardware arrangement of the commodity sales data processing apparatus shown in FIG. 1.

Next, a hardware arrangement of the commodity sales data processing apparatus 10 is described. FIG. 2 is a diagram illustrating the hardware arrangement of the commodity sales data processing apparatus 10. As illustrated in FIG. 2, the commodity sales data processing apparatus 10 includes the control unit 31 having a computer composed of a CPU (Central Processing Unit), a ROM (Read Only Memory), a RAM (Random Access Memory), and the like. The ROM stores various programs executed by the CPU and various data. The RAM functions as a work area of the CPU.

The first display 11, the operation unit 12, the printer 13, the card reader 14, the coin change machine 151, the bill change machine 152 and the warning lamp 16 described above are connected to the control unit 31 through various input/output circuits.

A storage unit 32 is connected to the control unit 31 through various input/output circuits. The storage unit 32 is composed of an HDD (Hard Disk Drive) or an SSD (Solid State Drive). The storage unit 32 stores various programs and setting information relating to an operation of the commodity sales data processing apparatus 10. For example, the storage unit 32 stores the setting information indicating a positional relationship in the height direction of the first antenna 24 and the second antenna 25.

The storage unit 32 also stores various data relating to a commodity sales data processing. For example, the storage unit 32 stores a commodity master file in which commodity information (inherent information) relating to each commodity is registered in association with a commodity code for identifying the commodity. Such commodity information includes, for example, a commodity name, a category, a unit price, and the like. The commodity information also includes an image data representing the appearance of the commodity (hereinafter, commodity image) and an explanatory text describing the feature of the commodity.

The image capturing unit 21, the second display 22, and the reader/writer 23 are connected to the control unit 31 through various input/output circuits.

The reader/writer 23 is connected to the first antenna 24 and the second antenna 25. The reader/writer 23 transmits radio waves from the first antenna 24 and the second antenna 25 under the control of the control unit 31. The reader/writer 23 reads tag information held in the RFID tag through the first antenna 24 and the second antenna 25. The tag information held in the RFID tag includes a tag identifier for discriminating the RFID tag from other RFID tags in addition to the commodity code of the commodity to which the RFID tag is attached.

The reader/writer 23 outputs the read tag information to the control unit 31 together with an antenna identifier for identifying an antenna that receives the tag information and a strength of received signal at the time the antenna receives the tag information. The strength of received signal is a physical amount such as an RSSI (Received Signal Strength Indicator).

Figure 3:
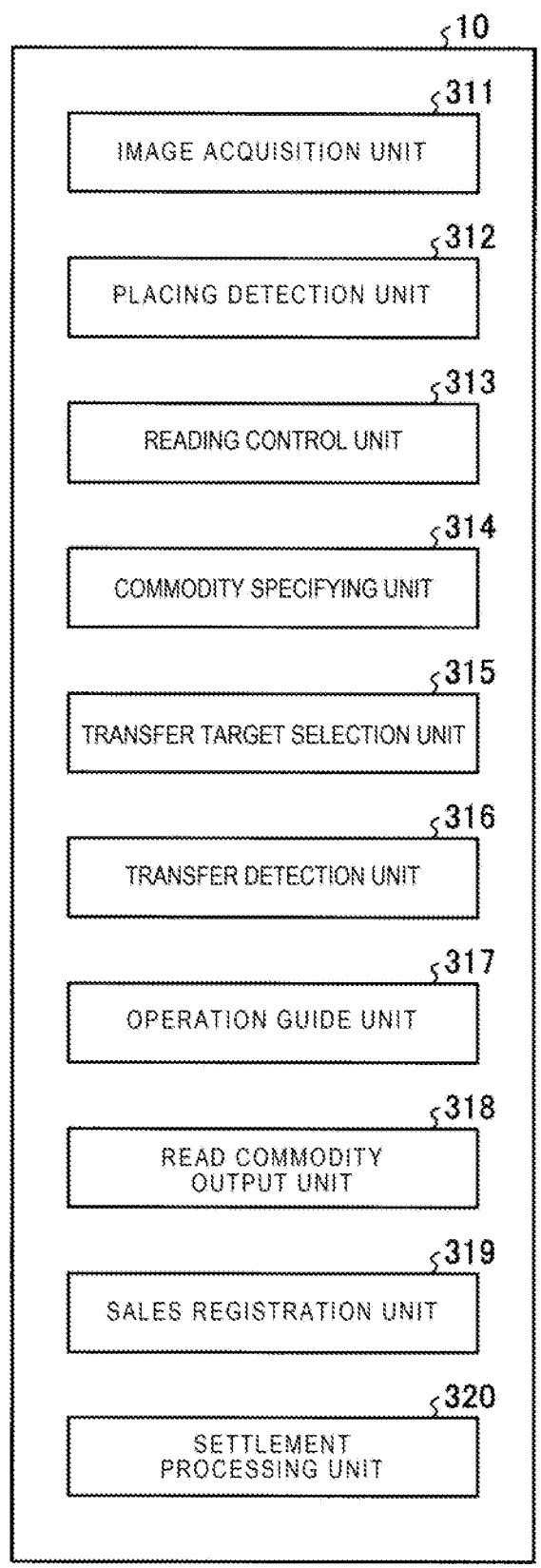
FIG. 3 is a diagram illustrating a functional constitution of the commodity sales data processing apparatus.

Next, a functional constitution of the commodity sales data processing apparatus 10 is described. FIG. 3 is a diagram illustrating the functional constitution of the commodity sales data processing apparatus 10.

The commodity sales data processing apparatus 10 includes, as functional units realized with programs executed by the control unit 31 (CPU), an image acquisition unit 311, a placing detection unit 312, a reading control unit 313, a commodity specifying unit 314, a transfer target selection unit 315, a transfer detection unit 316, an operation guide unit 317, a read commodity output unit 318, a sales registration unit 319, and a settlement processing unit 320.

The image acquisition unit 311 acquires an image captured by the image capturing unit 21 from the image capturing unit 21. The captured image is a still image or a moving images which are continuously captured at a predetermined frame rate.

The placing detection unit 312 detects that the shopping basket B1 or the commodity is placed in the first placing region A1. For example, the placing detection unit 312 recognizes an image of the shopping basket B1 or the commodity from the captured image by the image capturing unit 21 to detect the placing of the shopping basket B1 or the commodity. A method of detecting the placing is not limited to use the captured image, but another method may be used to detect the placing. For example, a sensor for object detection may be provided in the first placing region A1 on the work table, and the placing detection unit 312 may detect the placing of the shopping basket or the commodity in the first placing region A1 based on a sensing result of the sensor.

The reading control unit 313 is a functional unit for controlling a reading operation by the reader/writer 23. When the placing of the commodity or the basket in the first placing region A1 is detected by the placing detection unit 312, the reading control unit 313 controls the reader/writer 23 to start the reading of the RFID tag attached to the commodity. The reading control unit 313 acquires the tag information read from the RFID tag through the reader/writer 23.

The reading control unit 313 cooperates with the reader/writer 23 to control operations of the first antenna 24 and the second antenna 25. For example, the reading control unit 313 controls operations of first and second antennas 24 and 25 such that the first antenna 24 and the second antenna 25 simultaneously transmit radio waves. The reading control unit 313 controls the operations, for example, such that the first antenna 24 and the second antenna 25 alternatively transmit radio waves in a time-division manner.

Further, for example, the reading control unit 313 may change outputs of the first antenna 24 and the second antenna 25 respectively depending on a reading time to expand or reduce a communication range formed by radio waves transmitted from the first antenna 24 and the second antenna 25. The reading time indicates a time period from the start of the reading (reading start instruction) to the end of the reading (reading end instruction) by the reading control unit 313.

The commodity specifying unit 314 functions as a specifying module. The commodity specifying unit 314 specifies or identifies the commodity read by the first antenna 24 and the second antenna 25 as a read commodity based on the tag information acquired by the reading control unit 313. Specifically, the commodity specifying unit 314 retrieves a commodity specified with a commodity code in the commodity master file based on the commodity code included in the tag information to identify the commodity which is read. The commodity specifying unit 314 specifies or identifies the read commodity for each tag identifier even for a commodity having the same commodity code. The commodity specifying unit 314 checks a multiple identification based on the tag identifier to prevent the commodity having the same tag identifier from being identified in multiple.

The transfer target selection unit 315 functions as a selection module and a deducing module. The transfer target selection unit 315 selects a commodity to be taken out (hereinafter, transfer target commodity) from the first placing region A1 among the read commodities specified by the commodity specifying unit 314.

Specifically, the transfer target selection unit 315 deduces an overlapping relationship of the read commodities from the antenna identifier included in the tag information of the read commodity, and the received signal strength of the tag information. The transfer target selection unit 315 selects a read commodity at a position upper than other commodities as the transfer target commodity. Hereinafter, a method of selecting the transfer target commodity is described.

Figures 4A, 4B:
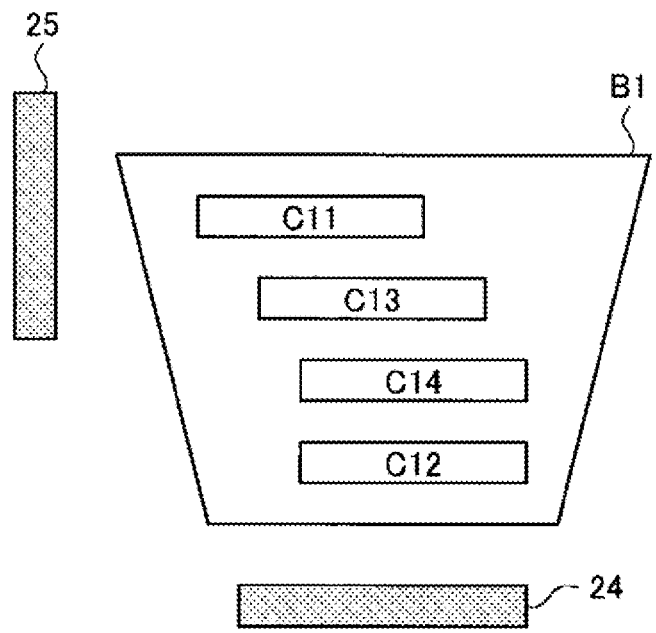
FIGS. 4A and 4B are diagrams illustrating an arrangement for description of a method of selecting a transfer target commodity.

FIGS. 4A and 4B are diagrams illustrating an arrangement for describing the method of selecting the transfer target commodity. FIG. 4A is a schematic diagram illustrating a positional relationship between the shopping basket B1 placed in the first placing region A1 and the first antenna 24 and the second antenna 25. Commodities C11 to C14 are contained in an overlapping manner in the shopping basket B1 in an order illustrated in FIG. 4A.

FIG. 4B is a diagram illustrating a table of the reading result of the commodities C11 to C14 illustrated in FIG. 4A. ANT1 and ANT2 are the antenna identifiers, and ANT1 indicates the first antenna 24 and ANT2 indicates the second antenna 25. Readability with each antenna is indicated by symbols ○ or x.

The transfer target selection unit 315 determines whether a read commodity read by only the second antenna 25 exists. If the read commodity read by only the second antenna 25 exists, the transfer target selection unit 315 deduces that the read commodity exists at a high position from the positional relationship in the height direction of the first antenna 24 and the second antenna 25. In FIG. 4B, the transfer target selection unit 315 determines that the commodity C11 read by only the second antenna 25 exists at a higher (upper) position among the commodities C11 to C14 in the shopping basket B1.

The transfer target selection unit 315 determines whether a read commodity read by both antennas of the first antenna 24 and the second antenna 25 exists. If the read commodity read by the both antennas exists, the transfer target selection unit 315 determines that the read commodity exists at a middle position based on the positional relationship in the height direction of the first antenna 24 and the second antenna 25. In FIG. 4B, the transfer target selection unit 315 determines that the commodity C13 read by the both antennas of the first antenna 24 and the second antenna 25 exists at the middle position among the commodities C11 to C14 in the shopping basket B1.

If the read commodity read by only the second antenna 25 does not exist, the transfer target selection unit 315 determines that the read commodity read by the both antennas exists at a high position.

The transfer target selection unit 315 also determines whether a read commodity read by only the first antenna 24 exists. If the read commodity read by only the first antenna 24 exists, the transfer target selection unit 315 determines that the read commodity exists at a low position based on the positional relationship in the height direction of the first antenna 24 and the second antenna 25. In FIG. 4B, the transfer target selection unit 315 determines that the commodities C12 and C14 read by only the first antenna 24 exists at the low position among the commodities C11 to C14 in the shopping basket B1.

If the read commodity read by only the second antenna 25 does not exist and the read commodity read by the both antennas of the first antenna 24 and the second antenna 25 does not also exist, the transfer target selection unit 315 determines that the read commodity read by only the first antenna 24 exists at the high position. If the read commodity read by only the second antenna 25 does not exist and the read commodity read by the both antennas of the first antenna 24 and the second antenna 25 exists, the transfer target selection unit 315 determines that the read commodity read by only the first antenna 24 exists at the low position.

The transfer target selection unit 315 selects one (C11) of the read commodities determined to exist at the high position among the commodities C11 to C14 in the shopping basket B1 as the transfer target commodity. If there are a plurality of read commodities which are selection candidates of the transfer target commodity, the transfer target selection unit 315 randomly selects one of the candidates or uses a deducing method described below to select one transfer target commodity.

The method of deducing the overlapping relationship of the read commodities is not limited to the above method. For example, the transfer target selection unit 315 may use an operation pattern of the first antenna 24 and the second antenna 25 to deduce the overlapping relationship of the read commodities. Specifically, if the first antenna 24 and the second antenna 25 are alternately operated, the transfer target selection unit 315 determines that a read commodity read during operation of the second antenna 25 exists at the high position. As one case, if the operation is performed in an order of the second antenna 25 and the first antenna 24, the transfer target selection unit 315 determines that a read commodity read prior to the next exists at the high position.

Figures 5, 6:
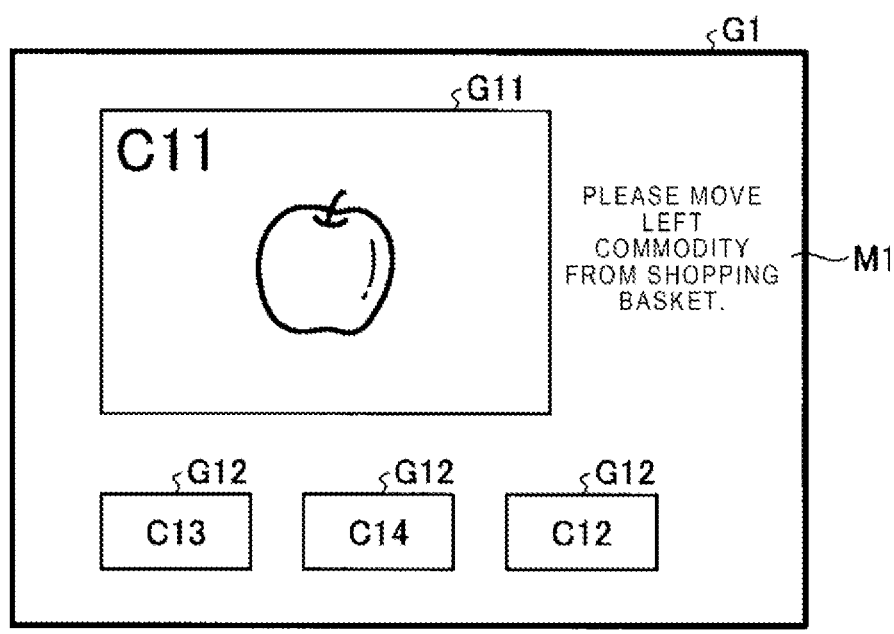
FIG. 5 is a diagram illustrating a table used in the method of selecting a transfer target commodity.
FIG. 6 is a diagram illustrating a guide screen displayed on a second display.

The method of selecting the transfer target commodity is not limited to the above, but another method may be used. FIG. 5 is a diagram illustrating a table of another reading result of commodities C21 to C24. In FIG. 5, the received signal strength (RSSI) is shown in association with the antenna identifier and the readability described with reference to FIG. 4B.

With reference to the reading result in FIG. 5, the commodities C21 and C23 are read by both the first antenna 24 and the second antenna 25, the commodities C22 and C24 are read only by the first antenna 24.

The transfer target selection unit 315 determines that the commodities C21 and C23 read by both the first antenna 24 and the second antenna 25 exist at the high position among the commodities C21 to C24. The transfer target selection unit 315 determines that the commodities C22 and C24 read by only the first antenna 24 exist at the low position among the commodities C21 to C24.

In such case, the read commodity determined to exist at the high position is a plurality of commodities C21 and C23. Thus, the transfer target selection unit 315, for example, compares the received signal strengths for the commodities C21 and C23 with one the other and selects one transfer target commodity based on the comparison result.

For example, the transfer target selection unit 315 compares the received signal strengths of the first antenna 24 and the second antenna 25 with one the other for each read commodity. The transfer target selection unit 315 selects one read commodity (RFID tag) from which the received signal strength of the second antenna 25 is higher than that of the first antenna 24 and a difference in the received signal strengths of the first antenna 24 and the second antenna 25 is larger as the transfer target commodity. In a case in FIG. 5, since the difference in the received signal strengths of the commodity C21 is larger than that of the commodity C23, the transfer target selection unit 315 selects the commodity C21 as the transfer target commodity.

As another method of utilizing the received signal strength, the transfer target selection unit 315 may compare the received signal strengths of the second antenna 25 between the read commodities. In this case, the transfer target selection unit 315 selects one read commodity having the higher received signal strength as the transfer target commodity.

In the present embodiment, if the plurality of read commodities existing at the high position exist, the selection of the transfer target commodity with the received signal strength is described. However, the selection method is not limited thereto, and the transfer target commodity may be selected with the received signal strength from the start.

As an index other than the received signal strength, the number of times of reading the commodity may be used. In this case, the transfer target selection unit 315 counts the number of times the read commodity is read (the number of times of reading) for each read commodity for each antenna (antenna identifier). The transfer target selection unit 315 compares the number of times of reading for each read commodity for each antenna with each other, like the received signal strength, to select the transfer target commodity.

The transfer detection unit 316 detects that the transfer target commodity selected by the transfer target selection unit 315 is moved from the first placing region A1 to another area (e.g., second placing region A2). A method of detecting the movement of the transfer target commodity is not particularly limited, and various methods can be employed.

For example, the transfer detection unit 316 may determine that the transfer target commodity is moved on a condition that the transfer target commodity has disappeared from the read commodities specified by the commodity specifying unit 314.

The transfer detection unit 316 may also determine that the transfer target commodity is moved on a condition that the disappearance of the transfer target commodity is detected and a motion of moving the commodity from the first placing region A1 to the second placing region A2 is detected from the captured image by the image capturing unit 21.

Further, as another method, the same antenna as the first antenna 24 (hereinafter, third antenna) may be provided in the second placing region A2, and the transfer detection unit 316 may detect the movement of the transfer target commodity through the third antenna. In this case, the third antenna is connected to the reader/writer 23 like the first antenna 24 and the second antenna 25. The transfer target selection unit 315 also specifies a corresponding commodity (hereinafter, transferred commodity) from tag information read by the third antenna. The transfer detection unit 316 may determine that the transfer target commodity is moved on a condition that the transferred commodity is identical with the transfer target commodity. In this case, the determination of consistency between the transferred commodity and the transfer target commodity may be performed by comparing both the commodity codes and the tag identifiers of the two commodities or comparing one of the commodity codes and the tag identifiers of the two commodities.

The operation guide unit 317 functions as a guide module. The operation guide unit 317 displays various screens for supporting or assisting a work of reading the commodity (RFID tag) on the second display 22. For example, the operation guide unit 317 displays a screen for instructing a customer to place the shopping basket B1 or the commodity in the first placing region A1 on the second display 22 if the shopping basket B1 or the commodity is not placed in the first placing region A1.

If the reading by the reading control unit 313 is started, the operation guide unit 317 displays a guide screen on which the movement of the read commodity to the second placing region A2 is instructed on the second display 22. Specifically, the operation guide unit 317 displays guide information for instructing the movement of the transfer target commodity from the first placing region A1 on the second display 22.

FIG. 6 is a diagram illustrating a guide screen displayed on the second display 22. A guide screen G1 shows a screen in a case in which the commodity C11 (refer to FIG. 4) is selected as the transfer target commodity.

If the commodity C11 is selected as the transfer target commodity, the operation guide unit 317 reads out commodity information of the commodity C11 from the commodity master file and displays the commodity name, and the commodity image as the guide information in a display region G11. The operation guide unit 317 also displays a message Ml for instructing the movement of the transfer target commodity from the shopping basket B1 as the guide information in association with the display region G11. Further, the operation guide unit 317 reads out commodity information of the read commodities (commodities C12 to C14) other than the transfer target commodity C11 from the commodity master file and displays the commodity names in a display regions G12, respectively.

A size of the display region G12 and an amount of information displayed in the display region G12 are preferably smaller than the display region G11. The number of display regions G12 displayed on the guide screen G1 is not particularly limited, and may be a fixed value or may be dynamically increased or decreased depending on the reading result. The order of the read commodity displayed in the display region G12 is not also particularly limited. For example, the operation guide unit 317 may display from the read commodity (other than transfer target commodity) existing at the higher position in a descending order in the display region G12 based on the overlapping relationship deduced by the transfer target selection unit 315.

If a new transfer target commodity is selected with the movement of the transfer target commodity, the operation guide unit 317 displays commodity information of the new transfer target commodity in the display region G11 to update display contents of the display region G12.

As describe above, the operation guide unit 317 presents information with which the transfer target commodity can be identified to the operator and instructs the operator to move the identified transfer target commodity from the first placing region A1. Accordingly, the operation guide unit 317 can effectively provide information to the operator which one of the commodities in the shopping basket in the first placing region A1 is to be moved.

Since an overlapping state and a positional state of the commodities located in the first placing region A1 change with the movement of the transfer target commodity, a communication environment between the first antenna 24 and the second antenna 25 and the commodities (RFID tags) changes. The transfer target selection unit 315 selects a transfer target commodity from read commodities newly read due to the change in the communication environment. The operation guide unit 317 instructs the operator the movement of the transfer target commodity every time the transfer target commodity is newly selected. Accordingly, since the commodity of which the reading is completed is taken out one by one from the shopping basket (first placing region A1) and then the overlapping between the commodities (RFID tags) is naturally eliminated, the reading of the commodity can be efficiently performed. Even if a commodity that cannot be read exists in the shopping basket, specifying (looking for) the commodity of which the RFID tag cannot be read can be easily performed because only the commodity remains in the shopping basket (first placing region A1).

A display arrangement of the guide screen G1 is not limited to that in FIG. 6. For example, in FIG. 6, displaying the transfer target commodity and the read commodities other than the transfer target commodity is illustrated, but the read commodities other than the transfer target commodity may not be displayed. The contents of the message Ml are not limited to that in FIG. 6. For example, the operation guide unit 317 may change the contents of the message Ml depending on whether or not an object placed in the first placing region A1 is the shopping basket B1. The operation guide unit 317 may also change the contents of the message Ml depending on a category (commodity code) or a classification of the transfer target commodity.

The commodity image is displayed on the guide screen G1 in FIG. 6, but the commodity image may be not displayed. The commodity image of a specific commodity may be not displayed. For example, the commodity image may be preferably not displayed depending on the category of the commodity. In such a case, a non-display flag for indicating that the commodity image is not displayed is set in advance for a specific commodity and a commodity belonging to a specific category registered in the commodity master file. The operation guide unit 317 determines whether or not the non-display flag is set for the transfer target commodity and the read commodities, and if the non-display flag is set, the commodity image is not displayed.

An arrangement in which the display and the non-display of the commodity image can be switched may be employed. For example, the operation guide unit 317 switches from the display of the commodity image to the non-display thereof and vice versa in response to the operation contents input through the operation unit 12. Another arrangement in which the display and non-display of the commodity image can be switched depending on the operator may be employed. To realize another arrangement, a switching flag for indicating the display or the non-display of the commodity image is set in association with the user identifier of the operator. In this case, the operation guide unit 317 switches from the display of the commodity image to the non-display thereof and vice versa in response to the switching flag corresponding to the user identifier read by the card reader 14. The switching flag may be stored in a card type storage medium together with the user identifier or may be stored in a database such as a membership master file that collectively manages the user identifier of each user.

In FIG. 6, the transfer target commodity is indicated by the commodity image prepared in advance, but the transfer target commodity may be indicated by the captured image by the image capturing unit 21. For example, the operation guide unit 317 displays the captured image in the display region G11, and displays in a highlighted manner an image region where the transfer target commodity exists in the captured image. Accordingly, the transfer target commodity can be indicated based on an actual state of commodities, and thus the transfer target commodity can be recognized more easily. A method of extracting the image region where the transfer target commodity exists is not particularly limited, and a known technique such as an image recognition can be used.

The operation guide unit 317 may display information other than the read commodity on the guide screen G1. For example, the operation guide unit 317 may display an approximate quantity of the commodities present inside the first placing region A1 (shopping basket B1) as an approximate value on the guide screen G1.

If the approximate value of the number of commodities is displayed, for example, the operation guide unit 317 recognizes the commodities from the captured image by the image capturing unit 21 with the image recognition to count the number of commodities N existing in the first placing region A1 as the approximate value. Next, the operation guide unit 317 displays on the guide screen G1 that the commodities more than N (approximate value) present in the first placing region A1 based on the counted number of commodities N. A method of counting the number of commodities is not limited to the method based on the captured image, and the read commodities may be counted.

Figure 7:
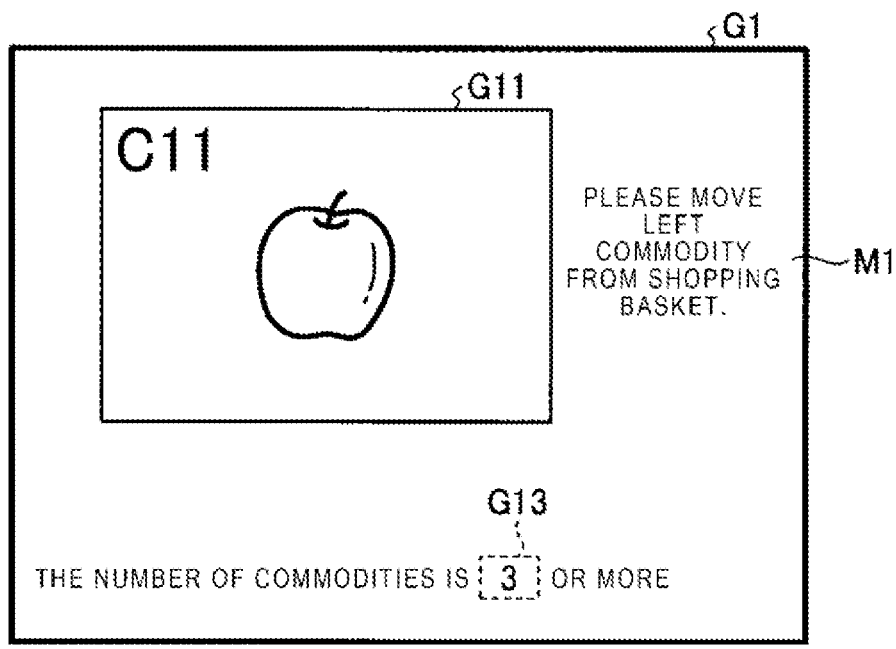
FIG. 7 is a diagram illustrating another guide screen displayed on the second display.

FIG. 7 is a diagram illustrating another guide screen displayed on the second display 22. FIG. 7 illustrates a screen on which the number of commodities is added to the guide screen G1 shown in FIG. 6.

For example, if the commodities C11 to C14 are contained in the shopping basket B1 in the overlapping manner shown in FIG. 4A, the image capturing unit 21 images the entire commodity C11 and a part of the commodities C13 and C14. If a captured image by the image capturing unit 21 is used, the operation guide unit 317 counts an approximate quantity (1, 2, or 3 in FIG. 4A) of the commodities from the images of commodities included in the captured image. The operation guide unit 317 displays an approximate value G13 ("3" in FIG. 7) of the counted number of commodities on the guide screen G1.

As described above, the operation guide unit 317 indicates the approximate value of the number of commodities existing in the first placing region A1 to the operator. Accordingly, the operator can perform the work of reading the commodity based on the approximate value of the number of commodities as a guide, and thus the convenience of the work of reading can be enhanced. The operation guide unit 317 may display the number of commodities obtained from the captured image without any modification or may perform a subtraction processing on the number of commodities in accordance with the movement of the transfer target commodity.

The read commodity output unit 318 outputs the commodity code of the read commodity to the sales registration unit 319. Specifically, if the movement of the transfer target commodity is detected by the transfer detection unit 316, the read commodity output unit 318 outputs the commodity code of the transfer target commodity together with the tag identifier thereof to the sales registration unit 319.

The sales registration unit 319 executes a sales registration processing for the commodity to be sold. Specifically, if the commodity code is input from the read commodity output unit 318, the sales registration unit 319 specifies commodity information of the commodity corresponding to the commodity code from the commodity master file. The sales registration unit 319 stores the commodity code of the specified commodity in the RAM in association with a quantity, a unit price, and the like of the commodity to perform the sales registration. The sales registration unit 319 checks multiple registration based on the tag identifier to prevent the commodity having the same tag identifier from being registered in multiple.

Figure 8:
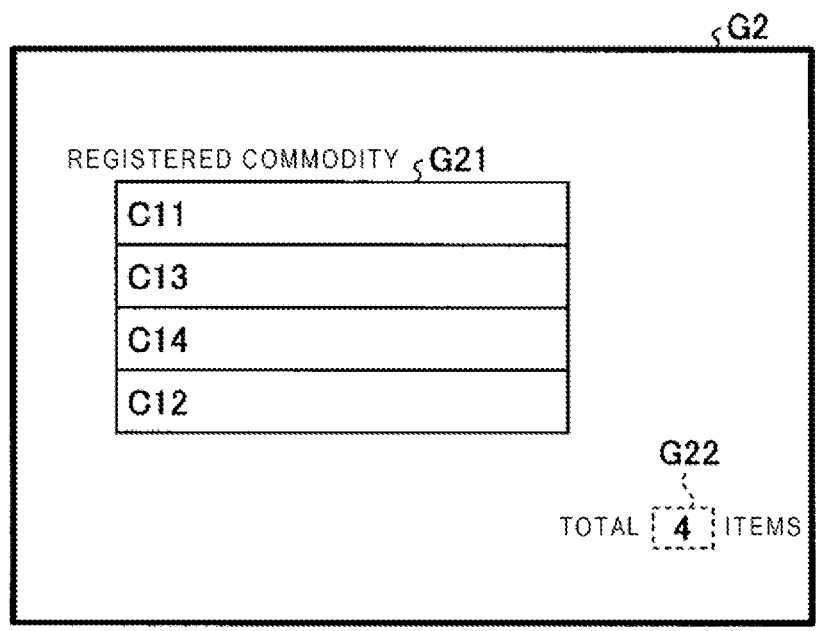
FIG. 8 is a diagram illustrating a registration screen displayed on a first display.

The sales registration unit 319 displays a registration screen indicating the commodity on which the sales registration is performed on the first display 11. FIG. 8 is a diagram illustrating the registration screen displayed on the first display 11. As illustrated in FIG. 8, the sales registration unit 319 displays the commodity name of each commodity on which the sales registration is executed in a registered commodity display region G21 in a list format on a registration screen G2. The sales registration unit 319 also displays the total quantity G22 ("4" in FIG. 8) of the commodities on which the sales registration is executed on the registration screen G2. A screen arrangement of the registration screen G2 is not limited to the screen shown in FIG. 8. For example, the sales registration unit 319 may display a unit price of the commodity on which the sales registration is executed, a total amount, and a commodity image on the registered commodity display region G21.

The settlement processing unit 320 cooperates with the coin change machine 151 and the bill change machine 152 to execute the settlement processing of the commodity on which the sales registration is executed. Specifically, if the operation input for instructing a reading completion (completion of sales registration) from the operation unit 12 is received, the settlement processing unit 320 executes the settlement processing in which the total amount for each commodity on which the sales registration is executed is settled with the deposited amount (payment amount). The settlement processing unit 320 subtracts the total amount from the deposited amount to calculate the change amount and dispenses money as the change amount. The settlement processing unit 320 outputs a receipt on which a detail (contents) of the transaction is printed from the printer 13.

Figure 9:
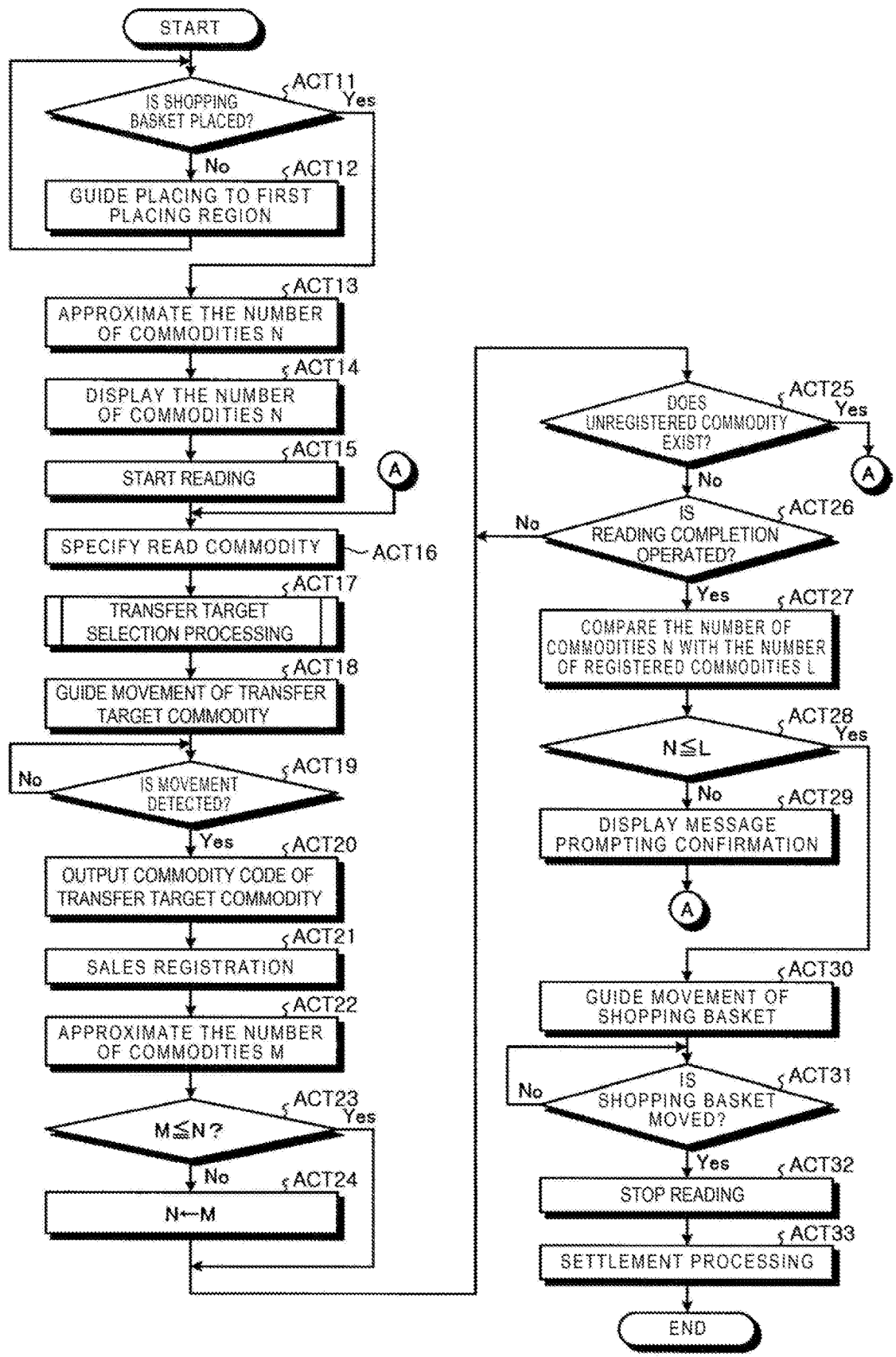
FIG. 9 is a flowchart illustrating a commodity sales data processing executed by the commodity sales data processing apparatus.

Next, an operation of the commodity sales data processing apparatus 10 is described. FIG. 9 is a flowchart illustrating the commodity sales data processing executed by the commodity sales data processing apparatus 10. In the processing, a workflow in which the number of commodities is approximated from the captured image by the image capturing unit 21 is described. In the workflow, the shopping basket B1 containing the commodities is placed in the first placing region A1.

First, in a state where the placing detection unit 312 does not detect the placing of the shopping basket B1 (No in Act 11), the operation guide unit 317 displays a screen (not illustrated) for instructing the placing of the shopping basket B1 in the first placing region A1 on the second display 22 (Act 12).

If the placing of the shopping basket B1 is detected by the placing detection unit 312 (Yes in Act 11), the operation guide unit 317 counts the number of commodities included in the captured image to approximate the number of commodities N present in the shopping basket B1 (Act 13). Next, the operation guide unit 317 displays the approximated number of commodities N on the guide screen of the second display 22 (Act 14). The N, and M and L described below are variables for numerical value storage.

The reading control unit 313 starts the reading of the RFID tag attached to each commodity in response to the detection of the placing by the placing detection unit 312 (Act 15). Next, the commodity specifying unit 314 specifies the read commodity based on the tag information (commodity code) obtained by the reading of the RFID tag for each commodity (Act 16).

Then, the transfer target selection unit 315 executes a transfer target selection processing of selecting the transfer target commodity from the read commodities based on the result of the processing in Act 16 (Act 17).

Figure 10:
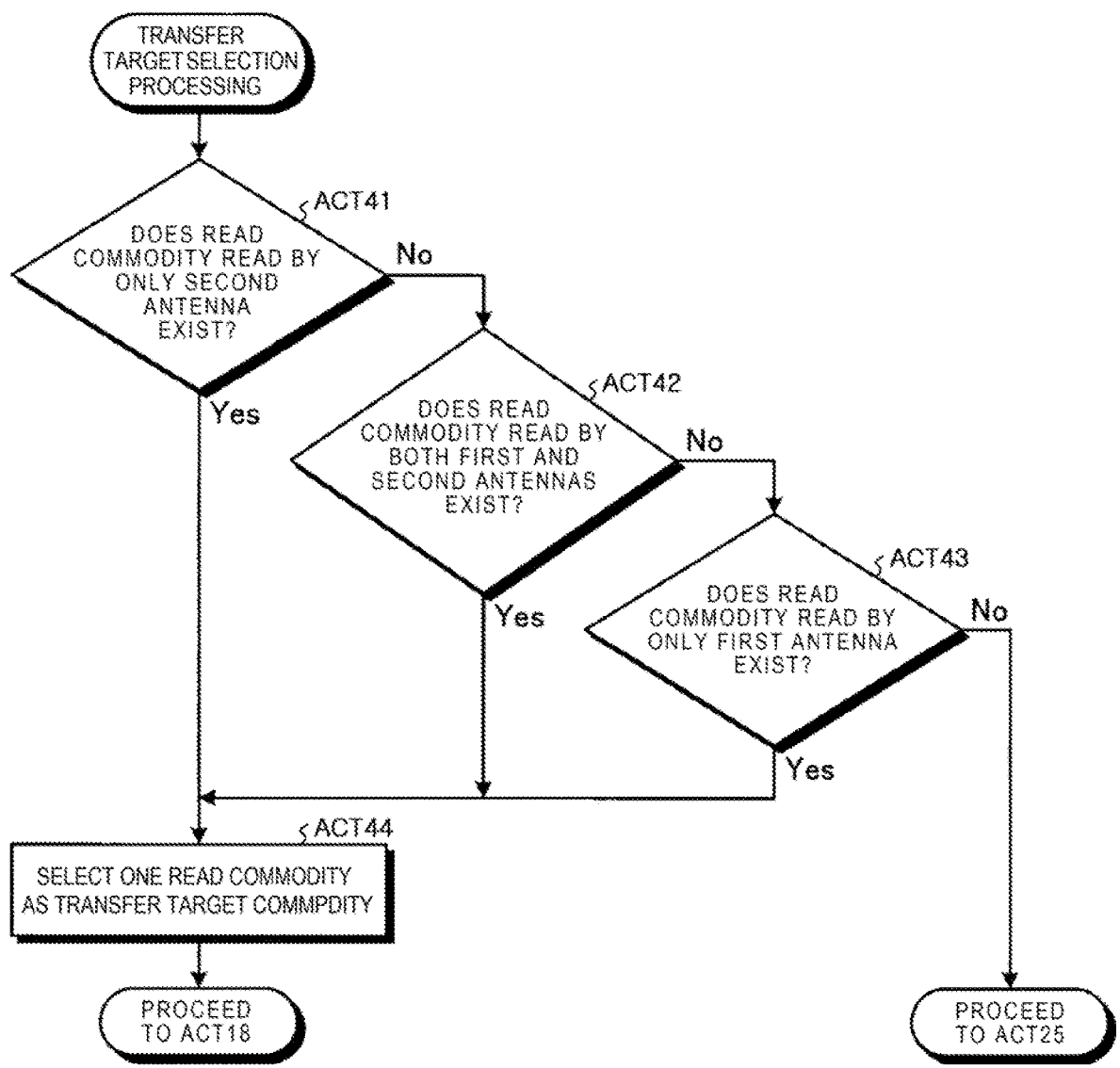
FIG. 10 is a flowchart illustrating a transfer target selection processing executed by a transfer target selection unit.

Hereinafter, the transfer target selection processing is described with reference to FIG. 10. FIG. 10 is a flowchart illustrating the transfer target selection processing executed by the transfer target selection unit 315.

First, the transfer target selection unit 315 determines whether or not a read commodity read by only the second antenna 25 exists among the specified read commodities (Act 41). If one read commodity read by only the second antenna 25 exists (Yes in Act 41), the transfer target selection unit 315 selects the one read commodity relevant to the determination described above as the transfer target commodity (Act 44) and proceeds to a processing in Act 18 in FIG. 9. If a plurality of read commodities relevant to the determination exist, the transfer target selection unit 315 selects one of the read commodities based on the received signal strength and the number of times of reading thereto.

If the read commodity read by only the second antenna 25 does not exist (No in Act 41), the transfer target selection unit 315 determines whether or not a read commodity read by both of the first antenna 24 and the second antenna 25 exists (Act 42). If one read commodity read by the both antennas exists (Yes in Act 42), the transfer target selection unit 315 selects the one read commodity relevant to the determination as the transfer target commodity (Act 44) and proceeds to the processing in Act 18 in FIG. 9. If a plurality of the read commodities relevant to the determination exist, the transfer target selection unit 315 selects one of the read commodities based on the received signal strength and the number of times of reading thereto.

If the read commodity read by both of the first antenna 24 and the second antenna 25 does not exist (No in Act 42), the transfer target selection unit 315 determines whether or not a read commodity read by only the first antenna 24 exists (Act 43). If one read commodity read by only the first antenna 24 exists (Yes in Act 43), the transfer target selection unit 315 selects the one read commodity as the transfer target commodity (Act 44) and proceeds to the processing in Act 18 in FIG. 9. If a plurality of the read commodities relevant to the determination exist, the transfer target selection unit 315 selects one of the read commodities based on the received signal strength and the number of times of reading thereto.

If the read commodity does not exist (No in Act 43), the transfer target selection unit 315 proceeds to a processing in Act 25 in FIG. 9.

Returning to FIG. 9, the operation guide unit 317 displays a guide screen for instructing the movement of the transfer target commodity from the shopping basket B1 based on the processing results of Acts 16 and 17 on the second display 22 (Act 18).

The transfer detection unit 316 waits for until the movement of the transfer target commodity is detected (No in Act 19). If the transfer target commodity is moved from the shopping basket B1 by the operator, the transfer detection unit 316 detects the movement of the transfer target commodity (Yes in Act 19). The read commodity output unit 318 outputs the commodity code of the moved transfer target commodity to the sales registration unit 319 in response to the movement detection in Act 19 (Act 20). The sales registration unit 319 performs the sales registration of the commodity corresponding to the commodity code based on the commodity code input from the read commodity output unit 318 (Act 21).

The operation guide unit 317 counts the number of commodities included in the captured image to approximate the number of commodities M present in the shopping basket B1 in response to the movement detection in Act 19 (Act 22).

Then, the operation guide unit 317 compares the number of commodities N with the number of commodities M to determine whether or not the number of commodities M is equal to or less than the number of commodities N (Act 23). If the number of commodities M is larger than the number of commodities N (No in Act 23), the operation guide unit 317 sets a value of the number of commodities M to the number of commodities N (Act 24) and proceeds to a processing in Act 25. The approximate value displayed on the guide screen G1 is also updated in accordance with the update of the number of commodities N.

If the number of commodities M is equal to or less than the number of commodities N (Yes in Act 23), the operation guide unit 317 proceeds to the processing in Act 25 while maintaining the value of the number of commodities N.

Then, the operation guide unit 317 determines whether or not a commodity not yet registered exists in the shopping basket B1 (Act 25). The operation guide unit 317 determines, for example, whether or not the read commodity is 0 (zero) or whether or not the value of the number of commodities M is 0 (zero) to determine whether the commodity not yet registered exists. If the operation guide unit 317 determines that the commodity not yet registered exists (Yes in Act 25), the operation guide unit 317 returns to the processing in Act 16. If the operation guide unit 317 determines that the commodity not yet registered does not exist (No in Act 25), the operation guide unit 317 proceeds to a processing in Act 26.

Then, the operation guide unit 317 determines whether or not the reading completion is instructed through the operation unit 12 (Act 26). If the reading completion is not instructed (No in Act 26), the operation guide unit 317 returns to the processing in Act 25.

If the instruction of the reading completion is received (Yes in Act 26), the operation guide unit 317 compares the number of commodities N with the number of commodities L of the registered commodity output by the reading commodity output unit 318 (Act 27). If the number of commodities N exceeds the number of commodities L (No in Act 28), the commodity not yet registered may exist. In this case, the operation guide unit 317 displays a message for instructing that the inside of the shopping basket B1 is confirmed (whether the commodity is left in the shopping basket) on the second display 22 (Act 29) and then returns to the processing in Act 16.

On the other hand, if the number of commodities N is equal to or less than the number of commodities L (Yes in Act 28), the operation guide unit 317 determines that the reading of all commodities is completed. In this case, the operation guide unit 317 displays a message for instructing the movement of the shopping basket B1 from the first placing region A1 on the second display 22 (Act 30).

The placing detection unit 312 waits for until the shopping basket B1 is moved from the first placing region A1, in other words, until no article is present in the first placing region A1 (No in Act 31). If the shopping basket B1 is moved from the first placing region A1 by the operator, the placing detection unit 312 detects the movement of the shopping basket B1 (Yes in Act 31). The reading control unit 313 stops the reading operation for the commodities in the shopping basket B1 in accordance with the movement detection in Act 31 (Act 32). The settlement processing unit 320 executes the settlement processing for the commodities on which the sales registration is performed (Act 33) and then ends the present processing.

As described above, if the commodity is placed in the first placing region A1, the commodity sales data processing apparatus 10 starts the reading of the RFID tag of each commodity by the first antenna 24 and the second antenna 25. When the commodity is read, the commodity sales data processing apparatus 10 selects one transfer target commodity from the read commodities and displays the guide screen G1 for instructing the movement of the one transfer target commodity from the first placing region A1 on the second display 22. Accordingly, since the commodity sales data processing apparatus 10 enables the operator to effectively recognize which commodity is to be moved from the first placing region A1, the efficiency of the reading work can be improved.

The commodity sales data processing apparatus 10 deduces the overlapping relationship of the read commodities to select the transfer target commodity from the commodity at the higher position in a descending order. Accordingly, in the commodity sales data processing apparatus 10, the operator can move commodities in order from the commodity that can be easily found and is easy to move, the efficiency of the reading work can be improved. Since the communication environment between the first and second antennas 24 and 25 and the RFID tag attached to the commodity changes with the movement of the transfer target commodity, the reading of the commodity can be effectively performed.

Hereinafter, modifications of the present embodiment are described.

First Modification

In the reading method of the present embodiment, the commodities existing in the first placing region A1 are reduced one by one with the movement of the transfer target commodity. However, in the method of counting the number of commodities in the present embodiment (FIG. 9), since the approximate maximum number of commodities N is displayed on the guide screen G1, the approximate value is not reduced even if the transfer target commodity is actually moved. In the first modification, an apparatus in which the approximate quantity of the number of commodities displayed on the guide screen can be changed with the movement of the transfer target commodity is described.

Figure 11:
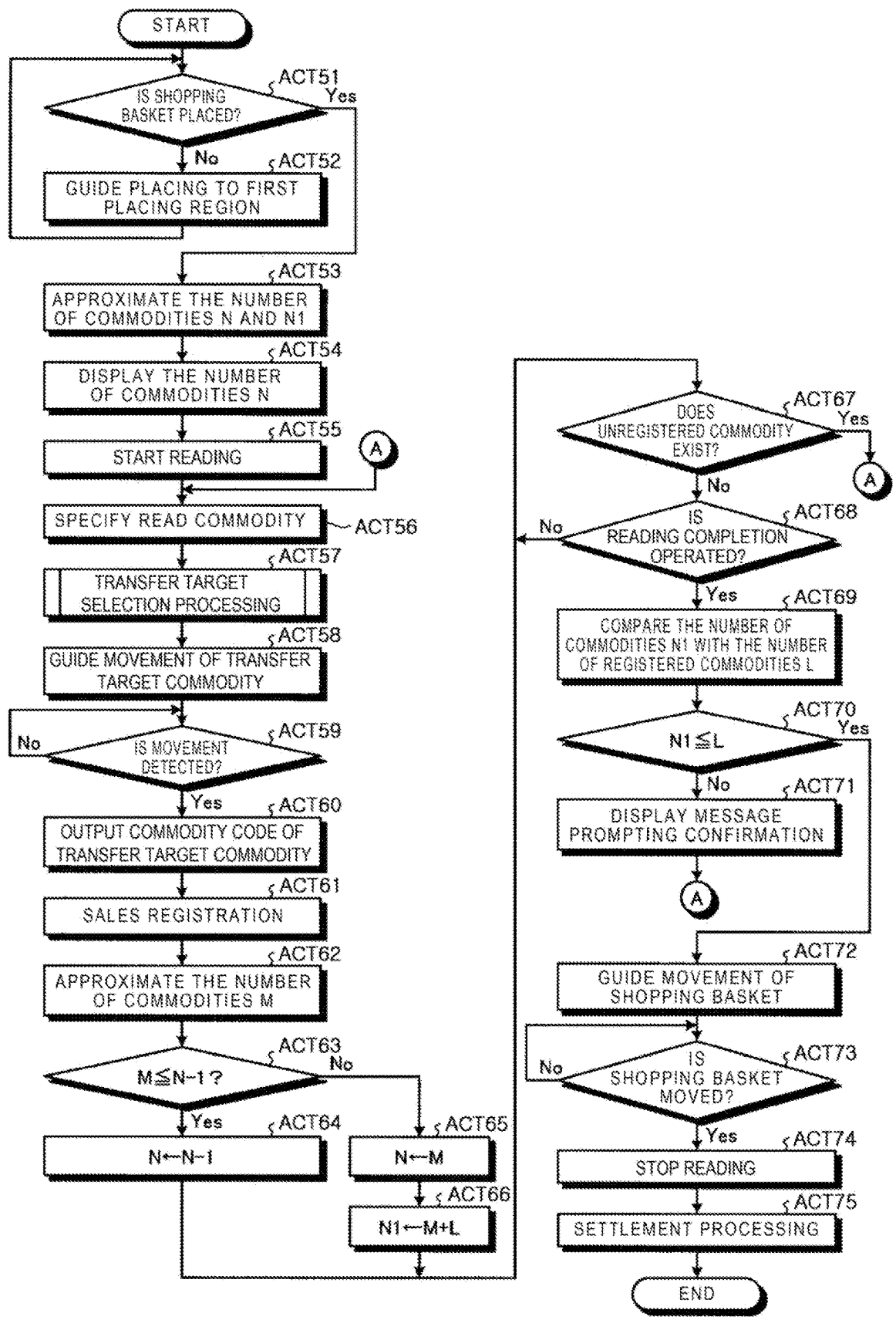
FIG. 11 is a flowchart illustrating a commodity sales data processing executed by a commodity sales data processing apparatus of a first modification.

FIG. 11 is a flowchart illustrating a commodity sales data processing executed by the commodity sales data processing apparatus 10 of the first modification. Processing in Acts 51, 52, 55 to 62, 67, 68, and 72 to 75 are the same as processing in Acts 11, 12, 15 to 22, 25, 26, and 30 to 33 in FIG. 9, and thus the description thereof is omitted.

In Act 53, the operation guide unit 317 counts the number of commodities included in the captured image to approximate quantity N and N1 of the commodities present in the shopping basket B1. N1 is a variable for numerical value storage, and the same value as the number of commodities (quantity) N is set to N1 in Act 53. A value of the number of commodities N is displayed on the guide screen G1 (Act 54).

In Act 63, the operation guide unit 317 determines whether or not the value of the number of commodities M approximated from the captured image is equal to or less than a value (N−1) obtained by subtracting 1 (one) from the number of commodities N. If the value of the number of commodities M is equal to or less than N−1 (Yes in Act 63), the operation guide unit 317 sets the value (N−1) to the number of commodities N (Act 64) and proceeds to a processing in Act 67. At this time, the approximate value displayed on the guide screen G1 is subtracted by 1 (one) with the processing in Act 64.

If the value of the number of commodities M exceeds N−1 (No in Act 63), the operation guide unit 317 sets the value (M) to the number of commodities N (Act 65). Next, the operation guide unit 317 sets a value (M+L) obtained by adding the number of commodities L of the registered commodity to the number of commodities M to the number of commodities N1 (Act 66) and proceeds to the processing in Act 67.

In Act 69, the operation guide unit 317 compares the number of commodities N1 with the number of commodities L of the registered commodity output by the read commodity output unit 318. If the number of commodities N1 exceeds the number of commodities L (No in Act 70), the commodity not yet registered may exist. In this case, the operation guide unit 317 displays a message for instructing a necessity of confirming inside of the shopping basket B1 on the second display 22 in Act 71 and then returns to the processing in Act 56.

If the number of commodities N1 is equal to or less than the number of commodities L (Yes in Act 70), the operation guide unit 317 determines that the reading of all commodities is completed to proceed to a processing in Act 72.

Accordingly, the commodity sales data processing apparatus 10 can update the approximate value of the number of commodities displayed on the guide screen G1 while subtracting the approximate value with the movement of the transfer target commodity.

Second Modification

There is a case in which a plurality of commodities of the same category, i.e., the same commodity code, and different tag identifiers may be included in the commodities purchased by a customer. In such a case, even if one of the commodities of the same category is indicated as the transfer target commodity, it is hard to recognize that which one of the plurality of commodities of the same category is required to be moved. Therefore, a different commodity of the same category may be moved as the transfer target commodity. In the second modification, a method of selecting the transfer target commodity if a plurality of commodities of the same category exists is described.

Figure 12:
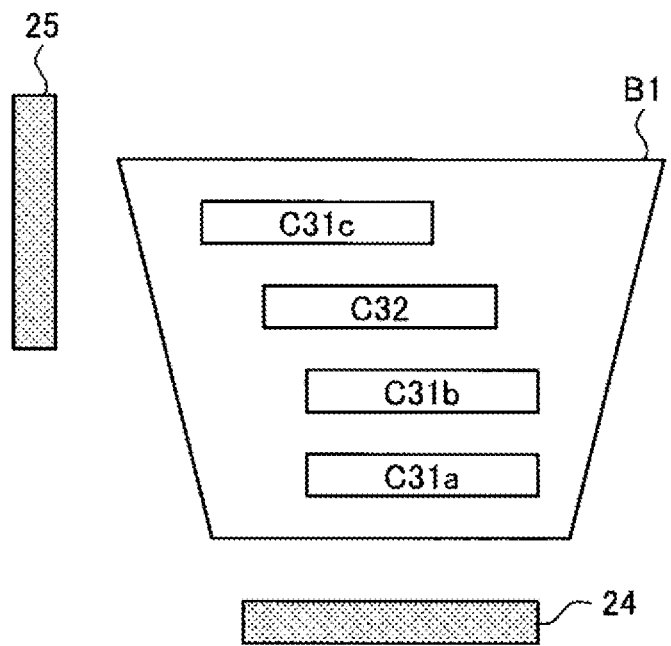
FIG. 12 is a diagram illustrating an arrangement for description of an operation of a transfer target selection unit of a second modification.

FIG. 12 is a diagram illustrating an arrangement for description of an operation of a transfer target selection unit 315 according to the second modification. FIG. 12 is a schematic diagram illustrating a positional relationship between the shopping basket B1 placed in the first placing region A1 and the first and second antennas 24 and 25. In the shopping basket B1, commodities C31a, C31b, C31c, and C32 are contained in an overlapping manner in an order illustrated in FIG. 12. The commodities C31a, C31b, and C31c belong to the same category with the same commodity code and having different tag identifiers.

As described above, the transfer target selection unit 315 can deduce the overlapping relationship of the commodities contained in the shopping basket B1 from the reading results of the first antenna 24 and the second antenna 25. In the state illustrated in FIG. 12, a commodity existing at the higher position is the commodity C31c. However, since the commodities C31a and C31b of the same category exist, the operator may not distinguish the commodity C31c from the commodities C31a and C31b even if the commodity C31c is specified as the transfer target commodity.

If the plurality of commodities of the same category in the read commodities exist, the transfer target selection unit 315 of the second modification lowers a priority relating to the selection of the transfer target commodity on the concerned commodity to select the transfer target commodity from another commodities, preferentially. For example, in FIG. 12, the commodity C31c exists at the high position. However, since the commodities C31a and C31b concerned (belonging to the same category) exist, the transfer target selection unit 315 does not select the commodity C31c as the transfer target commodity, but selects the commodity C32 existing at a next high position as the transfer target commodity.

Accordingly, the transfer target selection unit 315 of the present modification can preferentially move the commodity C32 from the shopping basket (first placing region A1) in which no commodities of the same category as the commodity C32 exist by the operator.

Figure 13:
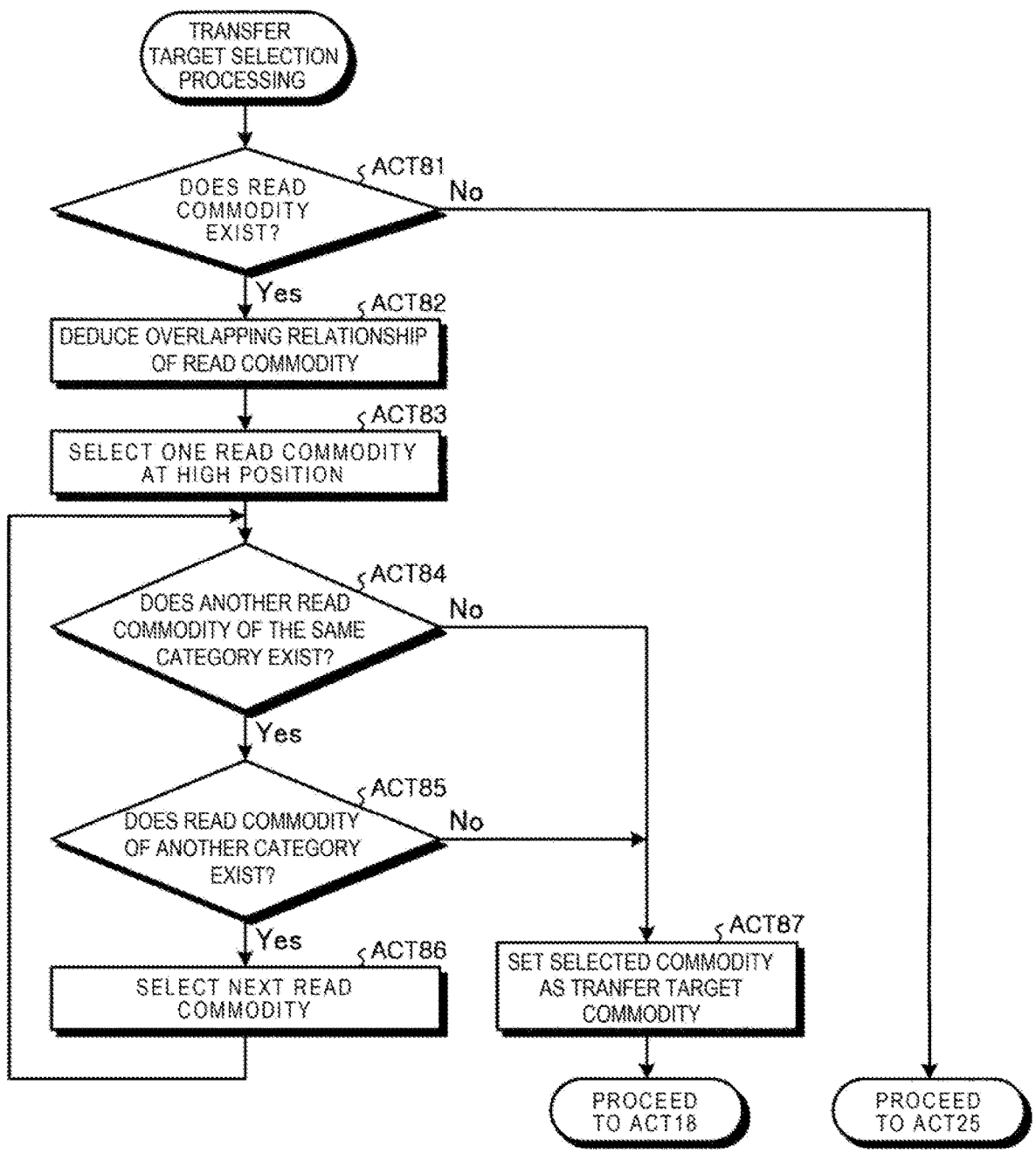
FIG. 13 is a flowchart illustrating a transfer target selection processing executed by the transfer target selection unit of the second modification.

Hereinafter, a transfer target selection processing of the second modification is described with reference to FIG. 13. FIG. 13 is a flowchart illustrating a transfer target selection processing executed by the transfer target selection unit 315 of the second modification. The transfer target selection processing shown in FIG. 13 is an alternative to the transfer target selection processing described referring to FIGS. 9 and 10.

First, the transfer target selection unit 315 determines whether or not the read commodity specified in the processing in Act 16 in FIG. 9 exists (Act 81). If the read commodity does not exist (No in Act 81), the processing in Act 25 in FIG. 9 is executed.

If the read commodity exists (Yes in Act 81), the transfer target selection unit 315 deduces the overlapping relationship of the commodities based on the reading result of the read commodities (Act 82). Next, the transfer target selection unit 315 selects one read commodity existing at the higher position (Act 83).

Then, the transfer target selection unit 315 determines whether or not another read commodity of the same category as the read commodity selected in the processing in Act 83 exists (Act 84). If another read commodity of the same category exists (Yes in Act 84), the transfer target selection unit 315 determines whether or not a read commodity of another category exists (Act 85).

If the read commodity of another category exists (Yes in Act 85), the transfer target selection unit 315 selects one read commodity existing at the next high position (Act 86) and returns to the processing in Act 84.

In Act 84, if the transfer target selection unit 315 determines that another read commodity of the same category does not exist (No in Act 84), the transfer target selection unit 315 sets the selected read commodity as the transfer target commodity (Act 87) and then proceeds to the processing in Act 18 in FIG. 9.

In Act 85, if the transfer target selection unit 315 determines that the read commodity of another category does not exist (No in Act 85), the transfer target selection unit 315 sets the selected read commodity as the transfer target commodity (Act 87) and proceeds to the processing in Act 18 in FIG. 9.

If the processing proceeds from Act 85 to Act 87, a read commodity existing at the higher position is preferably set as the transfer target commodity. If the processing proceeds from Act 85 to Act 18 via Act 87, a message for instructing the movement of the transfer target commodity and the number of the transfer target commodities are preferably displayed on the guide screen displayed in Act 18. Accordingly, since the operator can easily grasp how many transfer target commodities to be moved, the convenience relating to the reading operation of the commodity can be enhanced.

A target of which the priority in movement is lowered is not limited to the commodities of the same category. For example, commodities of which the appearance and shape are similar to one another even if the commodity codes are different from one another (hereinafter, similar commodities) exist among the commodities. The similar commodities include, for example, commodities of the same commodity name having different sizes, colors, or containing amounts (capacity). If a plurality of such similar commodities exist, the same problem as the commodities of the same category may occur. If the plurality of the similar commodities exist, similarly to the commodities of the same category, the priority relating to the selection of the transfer target commodity may be reduced. In this case, the commodity codes of the similar commodities are associated with each other in advance.

In the embodiment described above, the arrangement in which the two antennas (first antenna 24 and second antenna 25) are provided at different positions in the height direction is described, but the number of antennas is not limited thereto. For example, three or more antennas may be provided at different positions in the height direction. One antenna that can be movable in the height direction (vertical direction) may be provided. In this case, the reading control unit 313 reads the commodity while moving the antenna in the vertical direction. The transfer target selection unit 315 deduces the overlapping relationship of the commodities in a container such as a shopping basket based on an antenna position at the time the tag information is read.

In the embodiment described above, the commodity sales data processing apparatus 10 operates as the reading device. However, a dreading device independent of the commodity sales data processing apparatus 10 may read the commodity (RFID tag). In this case, the reading device includes the image capturing unit 21, the second display 22, the reader/writer 23, the first antenna 24 and the second antenna 25 and is connected to, for example, the commodity sales data processing apparatus 10 in a detachable manner. The reading device also includes a control unit having the same computer constitution as the commodity sales data processing apparatus 10. The reading device cooperates with the control unit and program stored in the ROM to realize the image acquisition unit 311, the placing detection unit 312, the reading control unit 313, the transfer target selection unit 315, the transfer detection unit 316, the operation guide unit 317, and the read commodity output unit 318. The reading device cooperates with the sales registration unit 319 and the settlement processing unit 320 of the commodity sales data processing apparatus 10 to execute the commodity sales data processing described above. An appearance shape of the reading device is not particularly limited, but may be, for example, the same appearance shape as the work table T1 illustrated in FIG. 1.

In the embodiment described above, the commodity sales data processing apparatus 10 of the self-checkout system is described. However, the exemplary embodiment is not limited thereto, but is realized in the commodity sales data processing apparatus 10 on which a store clerk executes the sales registration and the settlement processing.

The program executed by each device of the embodiment described above is provided by being installed in a storage medium (ROM or the like) included in the device in advance, but the exemplary embodiment is not limited thereto. For example, the program may be provided by being recorded in a computer-readable recording medium such as a CD-ROM, a flexible disk (FD), a CD-R, or a digital versatile disk (DVD) in a file having an installable format or an executable format. Further, the storage medium is not limited to a medium independent from the computer or an embedded system and includes a storage medium in which a program transmitted by a LAN, the internet, or the like is downloaded and is stored or temporarily stored.

The program executed by each device of the embodiment described above may be stored on a computer connected to a network such as the internet, may be provided by being downloaded via a network, or may be provided or distributed via a network such as the internet.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A reading device configured to read inherent information of a commodity from an RFID tag attached to the commodity, the reading device comprising:
   two or more antennas, arranged at different vertical locations with respect to a table having a placing region for receiving the commodity, the two or more antennas configured to transmit radio waves from the different vertical locations and receive a response with the inherent information from the RFID tag when the commodity is placed in the placing region;
   a specifying unit configured to specify the commodity in the placing region based on the inherent information read through the two or more antennas;
   a selection unit configured to select the commodity to be moved from the placing region among other commodities placed in the placing region based, at least partially, on a relationship between the commodities determined from which of the two or more antennas having received the response with the inherent information; and
   a guide unit configured to provide guide information for instructing a movement of the commodity selected by the selection unit from the placing region.

2. The reading device according to claim 1, further comprising a deducing unit configured to deduce an overlapping relationship of the commodity when other commodities overlap onto the RFID tag of the commodity, the deducing unit determining the overlapping relationship based on the vertical locations of the two or more antennas and their positions and arrangements in the vertical direction, or a received signal strength of the inherent information,
   wherein the selection unit selects one other commodity existing at a different vertical position than the commodity from a collection of the commodity and other commodities placed in the placing region.

3. The reading device according to claim 1, wherein the guide unit displays the guide information including an image of the commodity selected by the selection unit on a display unit.

4. The reading device according to claim 1, wherein the at least two antennas include a first antenna, arranged at a lower side of the table on which the placing region is formed, the first antenna transmitting radio waves from the lower side of the table toward the placing region, and a second antenna arranged at a wall extending vertically from the table, the second antenna transmitting radio waves from the wall toward the placing region, and
   wherein the specifying unit specifies the commodity based on the inherent information read through either the first antenna or the second antenna or both.

5. The reading device according to claim 1, further comprising
   an image capturing unit, arranged at an upper side with respect to the table, which is configured to capture an image of the placing region from the upper side; and
   an approximation unit configured to approximate a number of a plurality of commodities in the placing region from the image captured by the image capturing unit, the plurality of commodities including the commodity and other commodities;

wherein the guide unit displays the number of commodities approximated by the approximation unit together with the guide information.

6. The reading device according to claim 1, wherein the guide unit provides the guide information including an image of the commodity selected by the selection unit.

7. The reading device according to claim 1, wherein the commodity and other commodities are placed in a container.

8. A method of reading inherent information of a commodity from an RFID (radio frequency identification) tag attached to the commodity by two or more antennas arranged at different vertical locations with respect to a table on which a placing region is formed, the method comprising:
    placing at least one commodity having at least one RFID tag in the placing region on the table;
    reading, using the two or more antennas, the at least one RFID tag, wherein the two or more antennas transmit radio waves toward the at least one commodity in the placing region and receives inherent information from the at least one commodity;
    specifying the at least one commodity in the container based on the inherent information read at the at least two antennas;
    selecting the at least one commodity to be moved from the placing region among other commodities based, at least partially, on a relationship between the commodities determined from which of the two or more antennas having received the inherent information; and
    displaying guide information for instructing a movement of the selected commodity from the placing region.

9. The method of claim 8, further comprising deducing an overlapping relationship between the at least one commodity and other commodities placed in the placing region when the at least one commodity and other commodities are stacked on top of each other.

10. The method of claim 8, further comprising capturing, via an image capture unit, an image of the placing region and determining a number of one or more commodities placed in the placing region.

11. The method of claim 8, wherein displaying guide information comprises displaying a representation image of the selected at least one commodity.

12. The method of claim 8, wherein reading from the two or more antennas comprises placing a first antenna at a lower side of the table on which the placing region is formed, the first antenna transmitting radio waves from the lower side of the table toward the placing region, and placing a second antenna arranged at a wall extending vertically from the table, the second antenna transmitting radio waves from the wall toward the placing region.

13. The method of claim 12, wherein specifying the at least one commodity comprises specifying the at least one commodity based on the inherent information read through either the first antenna or the second antenna or both.

14. A device for identifying goods at a checkout table, the device comprising:
    two or more identifiers placed at different vertical locations with respect to the checkout table, the two or more identifiers operable to identify a tag;
    a placing region in the checkout table for receiving goods, wherein at least one of the goods includes the tag;
    a processor operable to receive information of the tag from the two or more identifiers, and based on the received information, specify a good corresponding to the tag and select the good to be moved out of the placing region among other goods placed in the placing region based, at least partially, on a relationship between the goods determined from which of the two or more identifiers having received information from the tag; and
    a guide unit, based on the processor operation, providing guide information for a user to move the selected good out of the placing region.

15. The device of claim 14, wherein the two or more identifiers are RFID antennas and the tag is an RFID tag.

16. The device of claim 14, wherein the processor is further operable to deduce an overlapping relationship of two or more overlapping goods carrying respective tags.

17. The device of claim 16, wherein the processor is operable to select a first good at a first vertical location and a second good at a second vertical location based on two or more tags identified by the two or more identifiers.

18. The device of claim 14, wherein the at least two identifiers comprises a first identifier embedded under the placing region and a second identifier placed at a wall extending vertically from the placing region.

19. The device of claim 18, wherein the processor specifies the good based on identifying information produced in the first identifier, or the second identifier, or both.

20. The device of claim 14, wherein the processor further comprises a specifying unit and a selection unit to perform respective operations.

* * * * *